United States Patent [19]
Russell, Jr.

[11] Patent Number: 5,926,957
[45] Date of Patent: Jul. 27, 1999

[54] COMPRESSION TOOL

[76] Inventor: Walter C. Russell, Jr., 507 E. Front St., New Bern, N.C. 28560

[21] Appl. No.: 08/883,621

[22] Filed: Jun. 26, 1997

Related U.S. Application Data

[60] Provisional application No. 60/020,916, Jun. 28, 1996.
[51] Int. Cl.⁶ .................................................. A47J 43/26
[52] U.S. Cl. ..................................... 30/120.4; 30/120.3
[58] Field of Search ............................. 30/120.2–120.5; 81/3.44

[56] References Cited

U.S. PATENT DOCUMENTS

| | | | |
|---|---|---|---|
| 2,379,121 | 6/1945 | Via | 30/120.3 |
| 2,431,550 | 11/1947 | Gary | 81/3.44 X |
| 2,490,615 | 12/1949 | Bloomfield | 30/120.4 |
| 2,554,420 | 5/1951 | Okey | 81/3.44 X |
| 4,536,958 | 8/1985 | Tosi | 30/120.3 |
| 4,614,034 | 9/1986 | Russell | 30/120.4 X |

*Primary Examiner*—Douglas D. Watts
*Attorney, Agent, or Firm*—Rhodes, Coats & Bennett, L.L.P.

[57] ABSTRACT

A compression tool for use in applying compression with a predetermined limited movement to a workpiece. The tool includes first and second lever arms with workpiece engaging surfaces and adjacent hinged ends. When compressing a workpiece, e.g., a nut, the hinged ends are urged apart, and a stop face is moved into the pathway of a stop edge on one of the lever arms to limit the movement of the arms toward each other.

5 Claims, 2 Drawing Sheets

COMPRESSION TOOL

This application claims benefit of provisional application Ser. No. 60/020,916 filed Jun. 28, 1996.

BACKGROUND OF THE INVENTION

(1) Field of the Invention

The present invention relates generally to a tool for applying pressure to an object, and in particular to a hand tool for applying a controlled pressure to nuts and other items.

(2) Description of the Prior Art

Most tools or devices for producing compression on a workpiece do so directly, usually using a form of lever action. When used as a nutcracker, such tools usually comprise a pair of straight-legged lever arms, hinged together at one end and having a mutually opposed roughened jaw sections on the lever arms. A nutcracker of this configuration has a serious disadvantage. While exerting maximum pressure on the nutshell there is a simultaneous effort to stop the crushing action at the instant of cracking the shell to prevent damage to the nutmeat. The requirement to control the pressure to prevent or minimize damage to the nutmeat at this time of exertion of maximum pressure on the nutshell is a task often impossible to achieve.

U.S. Pat. No. 4,614,034 to the present inventor describes a nutcracker in which the inward movement of the lever arms is limited when a nut is being crushed. The tool described in that patent is comprised of a pair of lever arms that are hinged at their ends by pins that are drawn toward each other by a spring. Each lever arm includes in inwardly facing, curved stop arm, having gear engaging teeth on the inner part of the curve.

A gear is positioned on either side of the tool, with one gear being in a plane with each top arm, so that one stop arm is positioned above one gear and the other stop arm is positioned beneath the other gear. A shaft is affixed to one gear and extends through an opening or receptacle in the other gear, with the receptacle being shaped to allow limited rotational movement of the shaft.

When a workpiece is not present, the hinged ends of the lever arms are held together by the spring, holding the stop arms away from the gears. However, when a workpiece is inserted between the lever arms, and the arms are compressed against the workpiece, the hinged ends are levered apart, causing the stop arms to engage the gears. With further compression, the stop arms rotate the gears in opposite direction, until the movement of the shaft within the receptacle reached a predetermined limit.

At that point, rotation of the gears is stopped, preventing further movement of the stop arms. Thus, the movement of the lever arms is also stopped at the predetermined limit. As a result, when cracking the shell of a nut, the lever arms can move toward each other sufficiently to crack the nut shell, but will stop before the nut meat is crushed.

While the above tool is generally effective in providing a controlled compression, there is still a need for a more rugged tool that would perform this function in a simple manner.

SUMMARY OF THE INVENTION

The present invention is directed to tool for applying a controlled force to a workpiece. The invention relates especially to a compression tool having a pair of opposed jaws, and limit means for halting the inward movement of the jaws after the workpiece has been compressed a predetermined distance.

The present invention relates to a compression- producing tool having a particularly advantageous use as a nutshell remover. Furthermore, the compression-producing tool of the present invention will crack and remove the shells more efficiently and without damage to the nutmeat.

A tool for applying compression e.g., a nutcracker having a hinged pair of lever arms pin connected to a common housing through a circular slot device. The housing contains the stopping device designed to provide a fixed crushing distance for the nut in every position in the lever arms. The fixed crushing distance will crush the nutshell without crushing the nutmeat. Furthermore, when a nut of other workpiece is not inserted in the tool, the lever arms are free to rotate, without restraint, making insertion of the nut a convenient and random action. From the standpoint of the user, the nutcrackers will look like and operate exactly like the majority of nutcrackers in use today. The major difference is the stopping action, which will prevent damage to the nutmeat and allow less fragmented crushing of the nut shell.

The compression tool of the present invention is comprised of first and second lever arms with facing workpiece gripping surfaces. The first lever arm includes a pair of spaced parallel, vertical plates at its hinged end, and a forward projecting, stop edge between the plates. The second lever arm includes an upstanding vertical block at its hinged end adapted to fit between the vertical plates of the first lever arm.

The vertical block of the second arm includes an opening extending through the block adapted to receive a pin extending between the plates of the first arm to join the arms together. The opening in the vertical block is comprised of a circular section and a slotted section extending from the circular section to the rear of the block toward the stop edge of the first lever arm.

A stop device includes a circular wheel adapted for insertion the circular section of the opening in the vertical block, and a J-shaped cradle arm extending from the circular section. The circular section includes an opening for receiving the hinge pin, with the opening having an inwardly curved upper and lower surfaces. The lower curvature of the opening is approximately equal to the curvature of the hinge pin, while the curvature of the upper surface is greater. A stop pin extends from one plate of the first arm for engagement within the "J" of the cradle arm. A spring is attached at opposite ends to the hinged ends of the lever arms to draw the ends toward each other.

When assembled, the circular section of the stop device is inserted within the circular section of the opening in the vertical block, with the cradle arm extending downward from the circular section outside the block. The stop pin extends from a plate on the first lever arm into engagement with the cradle arm. The hinge pin extends through the opening in the circular section of the stop device between the vertical plates of the first arm. The spring holds the hinged pin against the lower surface of the opening in the circular section, and the stopping face away from the path of the stop edge. As a result, the arms can be closed against each other.

When a workpiece, e.g., a nut, is inserted between lever arms, however, forcing of the arms together causes the arms to pivot at the workpiece. As a result, the hinged ends of the arms are pulled apart, and the hinge pin rides against the upper part of the opening in the circular section. Also, the stopping face is moved into the path of the stopping edge. The stop pin is also lifted from the cradle arm. As the arms are moved further together to compress the workpiece, the stopping edge engages the stopping face, halting inward movement of the arms. The distance between the stopping edge and stopping face can be constructed to a predetermined distance. Therefore, the extent of inward movement of the arms can be controlled.

Accordingly, a major object of this invention is to provide a compression tool that operates substantially as the nutcracker described above but including a stopping device to limit the extent to which the nutcracker can crush the nut. The presence of the stopping device will allow the user to exert maximum crushing pressure without trying to limit the closing distance of the lever arms of the compression producing tool.

Accordingly, one aspect of the present invention is to provide a compression tool for applying limited compression to a workpiece comprising a first lever arm having a hinged end and a stop edge movable along a pathway; a second lever arm having a hinged end and a stop face, the first and second arms including facing workpiece engaging surfaces; and yieldable tension means urging the hinged ends toward each other and the stop face out of the pathway of the stop edge, whereby compression of a workpiece between the workpiece engaging surfaces forces the hinged ends apart and the stop face into the pathway of the stop face, limiting the inward movement of the arms and the compression of the workpiece.

Another aspect of the present invention is to provide a compression tool for applying limited compression to a workpiece comprising a first lever arm having a hinged end, a stop edge movable along a pathway, and a hinge pin; a second lever arm having a hinged end and an a stop receiving opening, the first and second arm including facing workpiece engaging surfaces; a stop having a first member rotatable within the stop receiving opening and a stop face integral with the first member positionable within the pathway, the first member including a hinge pin opening for receiving the pin; and yieldable tension means urging the hinged ends of the arms toward each other and the stop face out of the pathway of the stop edge, whereby compression of a workpiece between the workpiece engaging surfaces forces the hinged ends apart and the stop face into the pathway of the stop face, limiting the inward movement of the arms and the compression of the workpiece.

Still another aspect of the present invention is to provide a compression tool for applying limited compression to a workpiece comprising a first lever arm having a first workpiece receiving surface and a hinged end, with a pair of spaced parallel plates at the hinged end, and a stop edge between the plates; a second lever arm having a second workpiece engaging surface toward the first workpiece receiving surface, a hinged end, and a stop receiving block with a stop receiving opening therein at the hinged end; a stop having a rotatable member within the stop receiving opening and a stop face integral with the first member, the rotatable member including a vertically elongated hinge pin opening having inwardly curved upper and lower surfaces; a hinge pin extending through the rotatable member, and having opposed ends joined to the plates; and a spring attached to the hinged ends of the arms to urge the hinged ends toward each other and the hinge pin against the lower surface of the pin opening, whereby compression of a workpiece between the workpiece engaging surfaces forces the hinged ends apart and the stop face into the pathway of the stop face, limiting the inward movement of the arms and the compression of the workpiece.

These and other aspects of the present invention will become apparent to those skilled in the art after a reading of the following description of the preferred embodiment.

DETAILED DESCRIPTION OF THE INVENTION

Figure 1:
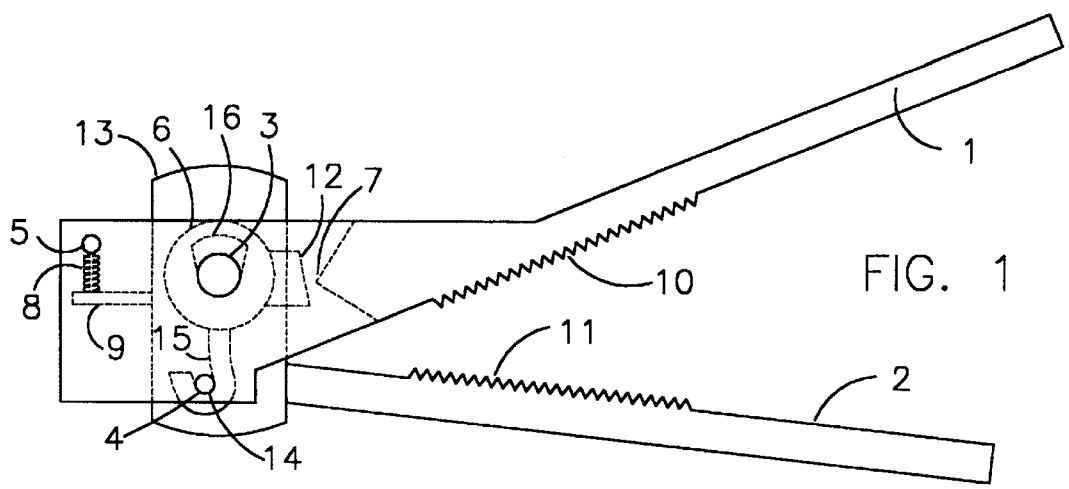
FIG. 1 is a drawing of the compression-producing tool in a non-stressed position, i.e. without a workpiece in the device a spring 8 under tension will be connected between pin 5 and arm 9 pulling pin 3 into the inward position, of stop device 6.
Figure 2:
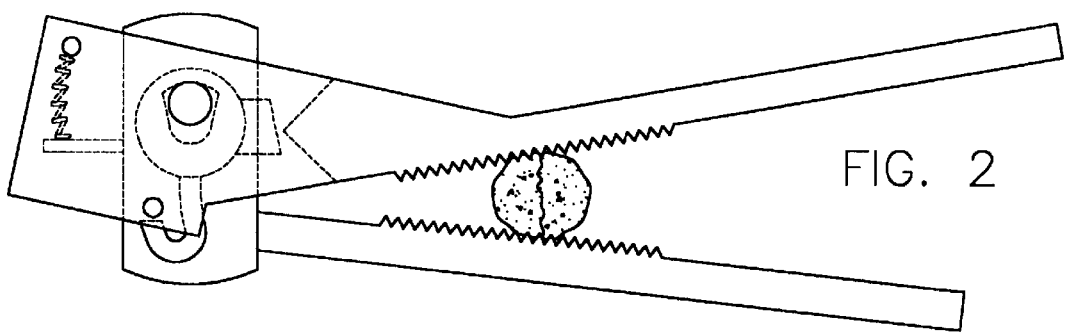
FIG. 2 is a drawing of the compression-producing tool with a nut providing stress to offset the spring action (note pins 3, 4, and 5 have moved to the outward positions causing the stopping edge 7, in lever arm 1, to re-position itself with respect to the stopping face 12 of the stop device 6.).
Figure 3:
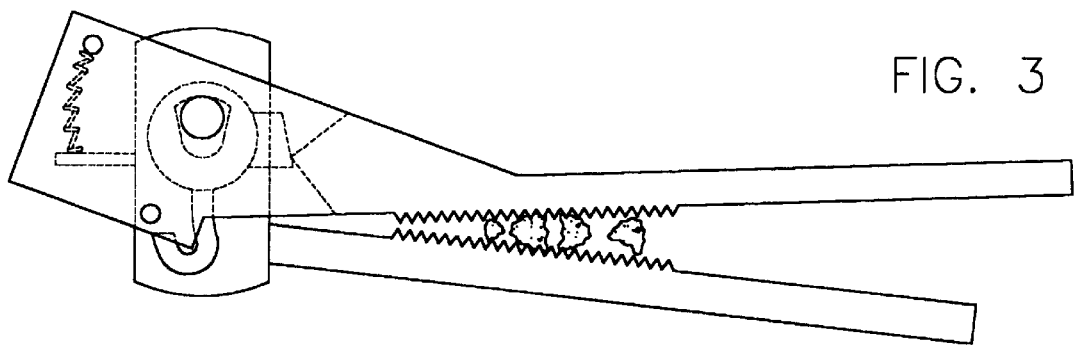
FIG. 3 is drawing of the compression-producing tool after the lever arms have rotated their maximum distance as allowed by the stopping device (Note stopping face 12 has made contact with stopping edge 7 preventing further rotation of lever arms 1 and 2).
Figure 4:
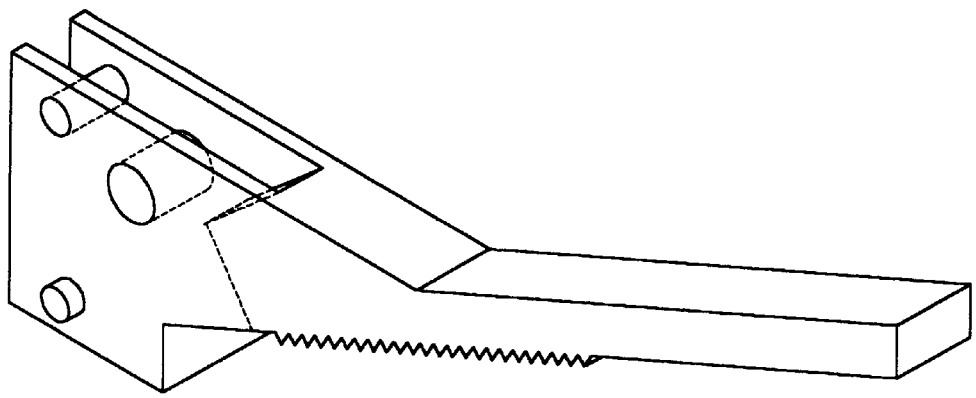
FIG. 4 is a clarification drawing of lever arm 1 shown from an angle to demonstrate how the stopping edge 7 and pins 3, 4, and 5 are all integral parts of lever arm 1.
Figure 5:
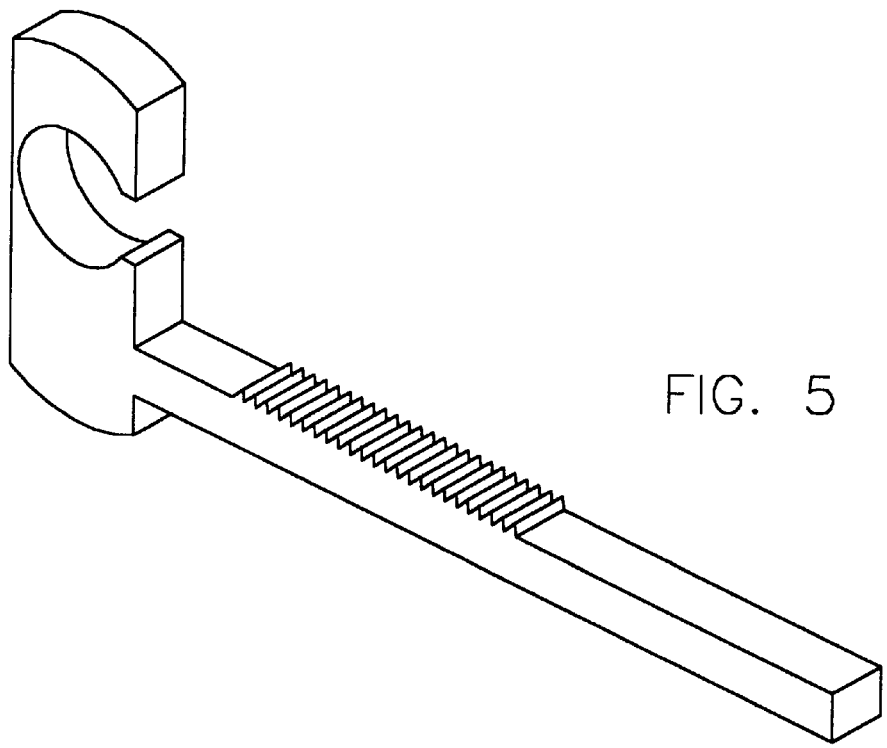
FIG. 5 is a clarification drawing of lever arm 2 shown from an angle to demonstrate how the stop device housing and spring arm 9 are all integral parts of lever arm 2.
Figure 6:
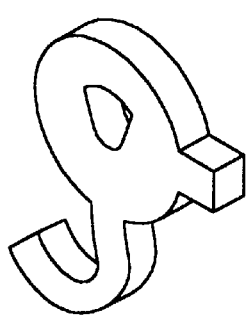
FIG. 6 is a clarification drawing of stop device 6 shown from an angle to demonstrate the wheel shape of the device with a protruding stopping face. There is a shaped elongated hole in the center of the wheel in which pin 3 is inserted. In addition there is a shaped extending arm at the bottom of the wheel with a cradle into which pin 4 is inserted (Note the wheel part of the stop device will be inserted into the housing of lever arm 2 and is free to rotate within limits imposed by the protruding stopping face). The extended arm is outside the housing but will also turn with the wheel.

As shown in FIGS. 1, 2, and 3, the compression-producing tool of the present invention has two lever arms 1 and 2 hinged together by pin 3 inserted through the elongated hole in stop device 6. The lever arms are free to rotate around or with pin 3.

Lever arms 1 and 2 have grooved surfaces 10 and 11 to hold the nut during the crushing motion. Lever arm 1 has a stopping edge 7 which when rotated around pin 3, in the stressed condition, will stop abruptly when striking the stopping face 12 of stopping device 6 [See FIG. 3].

The wheel part of the stopping device, inserted in the housing, has a shaped arm 15 with a cradle 14 which is outside the housing, i.e., is not inserted in the housing as in the wheel part of the stop device. Pin 4 of the lever arm 1 fits in the cradle of the stop device and rotates with lever arm 1. Pin 4 is a short pin and does not extend through the housing as does pin 3.

In operation, when the device of FIG. 1 is not held or held very lightly, spring 8 will spread lever arms 1 and 2 apart such that the lever arms will be wide enough to accommodate relatively large nuts and other workpieces.

With no nut or object to be compressed in the device, spring 8 will hold pin 3 in the inward position. In addition, pin 4 will be pulled inward and stay in the cradle 14 of stop device 6 [See FIG. 1]. In this position, the lever arms 1 and 2, will be free to rotate in and around pin 3. Pin 4 will rotate the stopping device 6, preventing the stopping edge 7 from striking the stopping face 12. Therefore, lever arms 1 and 2 will be free to move from fully closed to the fully open position with no restraint.

When a nut is inserted between the lever arms and a minor squeezing action is applied to the lever arms, an outward force is placed on pins 3, 4, and 5. This force causes pins 3, 4, and 5 to move outward, overcoming the spring action of spring 8. Lever arm 1 will move outwardly until pin 3 presses against the outer extremities of the elongated hole 16 of the stop device 6 [See FIG. 2].

At this point of the operation pin 3 is pressed against the outer extremities of the elongated hole, the stopping device has been rotated by pin 4 so that the stopping face 12 is in a predetermined position relative to the stopping edge 7. Further rotation of lever arm 1 around pin 3. Will produce a crushing action, until the rotation is stopped abruptly by stopping edge 7 striking stopping face 12 [See FIG. 3].

After pin 3 is pressed against the elongated hole and the crushing action begins the stopping device is designed to allow only a predetermined rotational movement which stops abruptly. This rotational movement crushes the nutshell and not the meat of the nut.

When releasing pressure on the lever arms, pins 3, 4, and 5 will be drawn inward by spring 8 and the tool will return to the configuration shown in FIG. 1.

While the operation described above occurs in distinct sequences, the actions, as sensed by the user, will tend to be a single crushing action which terminates abruptly after crushing the nutshell.

While the embodiment of the tool shown in FIG. 1 through 6 are the preferred embodiment of my compression-producing tool, many variations and improvements could be made to the specifics described. Therefore, the specifications and descriptions should not be construed as limitations upon the scope of the invention, but rather as an exemplification of a preferred embodiment thereof. Various other embodiments and ramifications will occur to those skilled in the art.

For example, while the nutcracker is designed for providing the same fixed crushing distance at every position of the nut in the lever arms other changes such as the surface cut of the stopping face and shape changes to the elongated hole could provide other fixed crushing distances and/or variable crushing distances for different positions of the workpiece in the lever arms.

While described for use as primarily a nutcracker, the device of this invention can also be used on other workpieces, such as hard-shell seafood.

While I believe that the above present theory of operation is accurate, I do not wish to be bound thereby since other and/or alternative theories of operation which explain the results of my nutshell remover may be applicable. Accordingly, the scope of the invention should be determined only by the appended claims, and their legal equivalents.

Certain modifications and improvements will occur to those skilled in the art upon a reading of the foregoing description. By way of example, the stopping face and stopping edges can be positioned at the front of the tool. Also, the tool can be used in applications other than the shelling of nuts or seafood. It should be understood that all such modifications and improvements have been deleted herein for the sake of conciseness and readability but are properly within the scope of the follow claims.

What is claimed is:

1. A compression tool for applying limited compression to a workpiece comprising:

a) a first lever arm having a hinged end and a stop edge movable along a pathway;

b) a second lever arm having a hinged end and a stop face, said first and second arms including facing workpiece engaging surfaces;

c) a locking means having a locked position holding said stop face out of the pathway of said stop edge when said arms are closed in the absence of a workpiece, and an unlocked position moving said stop face into the pathway of said stop edge when a workpiece is present; and d) a spring urging said hinged ends toward each other, whereby compression of a workpiece between said workpiece engaging surfaces unlocks said locking means and moves said stop face into the pathway of said stop face, limiting the inward movement of said arms and the compression of said workpiece.

2. The tool of claim 1, wherein said locking means comprises a cradle, and a stop pin attached to said first arm, said pin engaging said cradle in the absence of a workpiece.

3. A compression tool for applying limited compression to a workpiece comprising:

a) a first lever arm having a first workpiece engaging surface and a hinged end, and a stop edge moveable along a pathway;

b) a second lever arm having a second workpiece engaging surface facing said first workpiece engaging surface, a hinged end, and a stop member receiving opening;

c) a rotatable stop member positioned within said stop member receiving opening, said stop member having an outwardly projecting stop face, a cradle arm, and a vertically elongated hinge pin opening having upper and lower surfaces;

d) a hinge pin extending through said hinge pin opening, said pin having at least one end joined to said first lever arm; and e) a stop pin extending from said first lever arm, whereby movement of said workpiece engaging surfaces toward each other when a workpiece is between said workpiece engaging surfaces moves said hinge pin into engagement with said hinge pin upper surface to release said stop pin from said cradle, and move said stop face into the pathway of said stop face, limiting the inward movement of said arms and the compression of said workpiece when said stop face engages said stop edge.

4. The tool of claim 3, wherein said hinge pin has a given curvature, and said hinge pin opening has inwardly curved lower and upper surfaces, said lower surface having a curvature approximately equal to the curvature of said hinge pin, the curvature of said upper surface being greater than the curvature of said lower surface.

5. A compression tool for applying limited compression to a workpiece comprising:

a) a first lever arm having a first workpiece engaging surface and a hinged end, first and second spaced parallel plates at said hinged end, and a stop edge between said plates toward said hinged end, said stop edge being moveable along a pathway;

b) a second lever arm having a second workpiece engaging surface facing said first workpiece engaging surface, a hinged end, and a block with a circular stop member receiving opening therein at said hinged end between the plates of said first arm;

c) a rotatable stop member having a circular section positioned within said receiving opening, a stop face, and a cradle arm integral with said rotatable element, said rotatable element including a vertically elongated hinge pin opening having inwardly curved upper and lower surfaces;

d) a hinge pin extending through said hinge pin opening, said pin having opposed ends joined to said plates;

e) a stop pin extending from one of said plates; and f) a spring attached to the hinged ends of said arms to urge said hinged ends toward each other, said hinge pin against said hinge pin lower surface, and said stop pin into said cradle, whereby movement of said workpiece engaging surfaces toward each other when a workpiece is between said workpiece engaging surfaces forces said hinge pin into engagement with said hinge pin upper surface, releasing said stop pin from said cradle, and rotating said stop face into the pathway of said stop face, limiting the inward movement of said arms and the compression of said workpiece when said stop face engages said stop edge.

* * * * *